Sept. 18, 1934.   I. S. OSBORN   1,974,250
INCINERATING PLANT
Filed Dec. 21, 1932   3 Sheets-Sheet 1
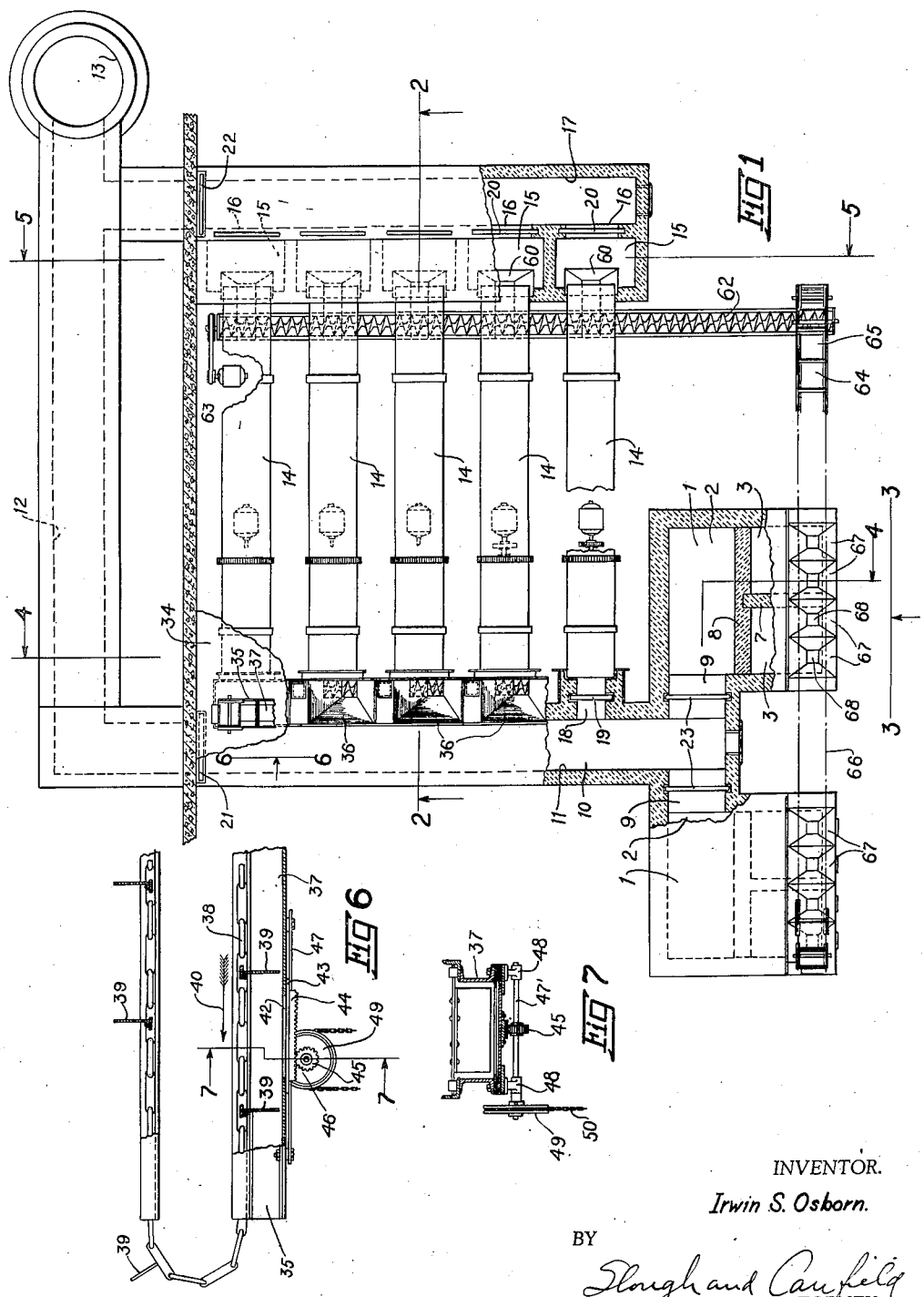
INVENTOR.
Irwin S. Osborn.
BY
Slough and Canfield
ATTORNEY.

Sept. 18, 1934.   I. S. OSBORN   1,974,250
INCINERATING PLANT
Filed Dec. 21, 1932   3 Sheets-Sheet 2
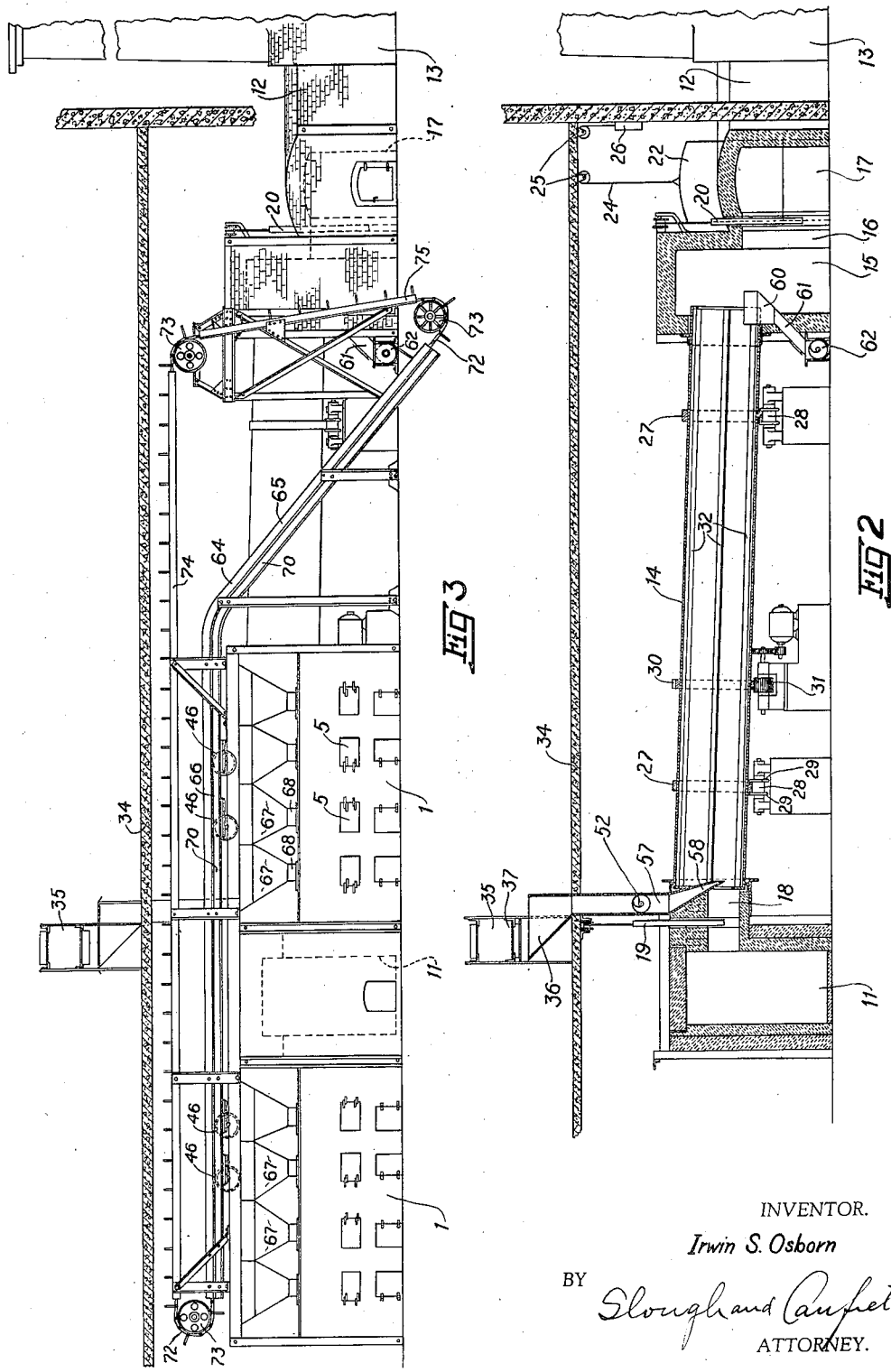
INVENTOR.
Irwin S. Osborn
BY Slough and Caufield
ATTORNEY.

Sept. 18, 1934.   I. S. OSBORN   1,974,250
INCINERATING PLANT
Filed Dec. 21, 1932   3 Sheets-Sheet 3
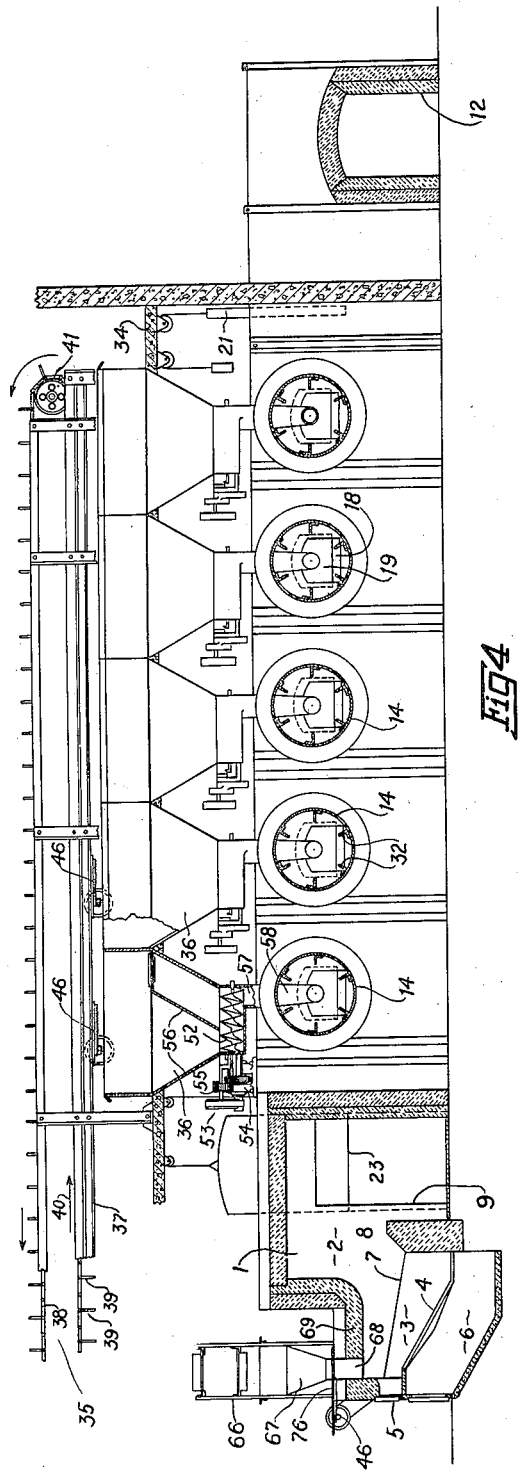
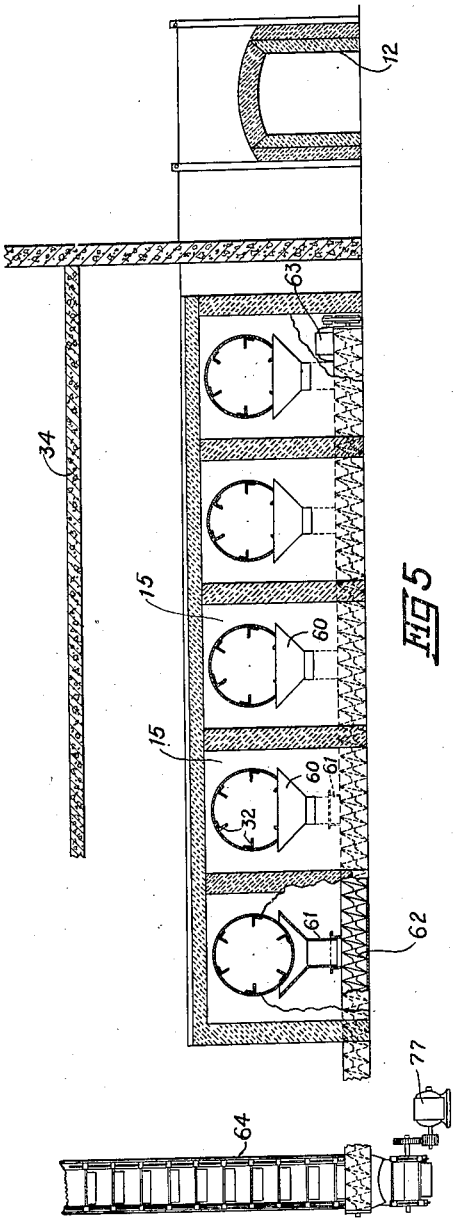
INVENTOR.
Irwin S. Osborn
BY
ATTORNEY.

Patented Sept. 18, 1934

1,974,250

UNITED STATES PATENT OFFICE 1,974,250

INCINERATING PLANT

Irwin S. Osborn, Cleveland Heights, Ohio, assignor to The C. O. Bartlett & Snow Company, Cleveland, Ohio, an organization of Ohio Application December 21, 1932, Serial No. 648,171

7 Claims. (Cl. 110—15)

This invention relates to means and methods for incinerating garbage, refuse and the like.

It is the practice in municipalities, particularly large cities, to collect garbage and rubbish produced in and about households, hotels, restaurants, lunchrooms, clubs, hospitals, etc., and to transport the same to incinerating plants for the disposal thereof by combustion.

Such plants comprise permanent buildings having therein receiving floors or pits upon or in which the collected refuse or garbage is dumped from the collecting wagons or trucks; and furnaces into which the refuse may be charged periodically to be burned; and various apparatus accessory to the furnaces to control the combustion of the refuse therein; and receptacles and apparatus for collecting and disposing of ashes and like residue from the furnace grates.

Such plants necessarily must be erected convenient to the refuse collection facilities and therefore in or closely adjacent to the city being served, and thus must almost invariably be erected upon land at relatively great value. Furthermore, it has been found desirable to construct the incinerating furnaces and accessory apparatus in units partly for the reason that there is a natural limit to the size and capacity of a single combustion unit, and partly because of the need for flexibility of capacity of the plant whereby its operating capacity may be increased or diminished in accordance with the rate at which garbage, refuse and the like is supplied to the plant for incineration.

Thus, incinerating plants, particularly where their needed capacity warrants the construction of two or more units, have been heretofore unavoidably expensive to construct and operate and in most instances have occupied large areas of valuable land which, of course, has increased still further the expense of installation and the carrying charges therefor.

Thus, the problem is presented of constructing an incinerating plant which for a given capacity may be erected upon the smallest practicable area of ground without interfering with or detracting from the efficiency and convenience of its operation. This problem is rendered more difficult when the incinerating plant is of the class which completely burns garbage, refuse and the like of high moisture content.

In some municipalities, garbage is collected separate from rubbish and in others there is combined collection. Garbage as ordinarily collected has a moisture content averaging from 70 to 75% by weight and consequently has very low calorific value. Rubbish, however, usually includes such material as discarded paper, pasteboard, rags, mattresses, furniture, clothing, carpets, packing boxes, leaves, grass cuttings, etc. Obviously, such rubbish has relatively high calorific value.

When a sufficient quantity of such rubbish is mixed with the garbage, the mixture can readily be destructively burned in an incinerating plant.

But in municipalities where rubbish collections are not made or where the rubbish so collected is not sufficient to supply the necessary heat units or fuel necessary to burn the garbage, coal or other supplemental fuel is required thus making the incinerating operation expensive.

Sewage sludge is another class of refuse which contains so much moisture in proportion to the potential heat units therein that it is generally found impossible to effect complete destructive combustion thereof without the use of supplemental fuel such as coal, oil, gas etc.

It will be generally understood that in burning refuse, if it be garbage, or sewage sludge or the like, or a mixture thereof with rubbish, the high moisture content of the refuse must first be reduced to render it combustible; and in this connection it is generally recognized in this art that materials such as garbage and sewage sludge having a moisture content of 70% and over by weight cannot be self-consumed by the heat units contained therein and that to destroy such refuse by incineration the furnace must be fired with supplemental fuel to supplement the heat units in the refuse.

Furthermore, even in incinerating plants in which refuse of high moisture content is to be consumed with the aid of supplemental fuel, problems arise in connection with the successful operation of the plant involving the reduction of the moisture content in the refuse to be burned. Where the attempt is made to reduce the moisture content of the refuse by a conditioning process prior to charging it into the furnace, there is always the liability that the pre-drying of the material may be carried to a point where it will give off objectionable odors which escape into the air in the neighborhood of the plant and become in the nature of a nuisance.

Therefore an object of my invention is to provide an incinerating plant for refuse, garbage and the like of improved construction wherein the maximum of incinerating capacity may be provided for the minimum of ground area.

Another object of my invention is to provide an improved incinerating plant construction of the unit combustion type.

Another object is to provide an incinerating plant construction whereby a given incinerating furnace capacity may be provided at the minimum of construction and installation expense.

Another object is to provide an incinerating plant having improved operating characteristics.

Another object is to provide an incinerating plant having improved combustion characteristics.

Another object is to provide an incinerating plant of the type comprising a plurality of units and wherein one unit may be operated without interference from another unit in an improved manner.

Another object is to provide an incinerating plant adapted to be operated economically from the standpoint of labor.

Another object is to provide a unitary incinerating plant of the class referred to for the destructive combustion of refuse such as garbage, sewage sludge or the like having high moisture content by utilization of the heat units contained therein and without supplemental fuel.

Another object is to provide an incinerating plant of the type referred to which employs potential heat units of a quantity of refuse such as garbage or the like of high percentage moisture content, to first reduce the percentage of moisture of the refuse and then to consume it by combustion.

Another object is to provide an incinerating plant of the class referred to which employs the potential heat units of a quantity of refuse such as garbage or the like of high percentage moisture content, to first reduce the percentage of moisture of the refuse and then to consume it by combustion and without supplemental fuel.

Another object is to provide an incinerating plant of the class referred to wherein the moisture content of refuse to be burned may be reduced in a manner to prevent the concurrent emanation of odors from the refuse being heated.

Another object is to provide an improved construction of incinerating plant for the destructive combustion of refuse, sludge or the like of high percentage moisture content.

Another object is to provide an improved construction of incinerating plant for the destructive combustion of refuse, such as garbage, sewage sludge, or the like, by utilization of the heat units contained therein the refuse being of such high moisture content or relatively low heat value as to be impossible of combustion by prior incinerating plants, without the aid of supplemental fuel, and which plant may be used for the destructive combustion of refuse having still higher moisture content or still lower relative heat value, by the employment of a relatively small quantity of supplemental fuel or supplemental heat units, whereby such refuse of excessively high moisture content or low heat value may be destructively consumed with the employment of less supplemental fuel than has heretofore been possible.

Other objects will be apparent to those skilled in the art to which my invention appertains.

My invention is fully disclosed in the following description taken in connection with the accompanying drawings, in which:—

Fig. 1 is a top plan view with parts thereof broken away for clearness of an incinerating plant constructed according to my invention;

Fig. 2 is a longitudinal sectional view taken from the plane 2—2 of Fig. 1 and drawn to a larger scale;

Fig. 3 is an elevational view taken from the plane 3—3 of Fig. 1 and drawn to a larger scale;

Fig. 4 is a transverse sectional view taken from the plane 4—4 of Fig. 1 and drawn to a larger scale;

Fig. 5 is a transverse sectional view taken from the plane 5—5 of Fig. 1 and drawn to a larger scale;

Fig. 6 is a fragmentary view of a conveyor construction which I may employ and which may be considered as taken from the plane 6—6 of Fig. 1 and drawn to a larger scale, or as a fragmentary part of Fig. 2 and drawn to a larger scale;

Fig. 7 is a sectional view taken from the plane 7—7 of Fig. 6.

Referring to the drawings, I have shown generally at 1—1 a pair of furnaces comprising each a combustion chamber 2, a pair of combustion cells 3—3, each cell being provided with grate bars 4 (see Fig. 4), a stoking door 5 and an ash pit 6 under the grate bars.

In Fig. 1 the two cells are clearly illustrated (the grate bars therein being omitted to simplify the drawings), and the two cells are separated by an intermediate wall 7 over which the hot gases of combustion of one cell may flow to heat and render readily combustible fresh material which may be discharged upon the grate bars of the other adjacent cell. Both cells have outlets for the products of combustion over a wall 8 into the combustion chamber 2 wherein the gaseous products of combustion from material on the grate bars 4 may thoroughly mix and complete combustion be effected.

The products of combustion may flow through the combustion chamber 2 and under certain selective conditions of operation to be described, may flow laterally out of the combustion chamber through a passageway 9 and thence through a relatively long duct 10 comprising branches 11 and 12 disposed preferably at right angles to each other and thence to a stack 13; or may flow out of the combustion chamber 2 through the passageway 9 and into the duct branch 11 and thence through passageways 18 into one end of a plurality, such as five as illustrated, of cylinders 14—14 of drier devices, to be described, and through and out of the cylinders 14 at the opposite ends thereof into respective discharge chambers 15—15 and thence through doorways or passageways 16—16 into a common duct 17 and thence to the stack 13, preferably by way of a portion of the duct 12.

The two furnaces 1—1 may be identical and each one may have a passageway 9 communicating with the duct branch 10.

The relative proportion of the hot gaseous products of combustion which flow over these two conduit paths may be operatively controlled or regulated by vertically adjustably movable dampers or slides controlling various of the passageways above mentioned, and adapted to be raised or lowered to open or close their passageways to any desired extent. The passageways 18 are controlled by slides 19, Figs. 1 and 2; and the passageways 16 are controlled by slides 20—20, and the proportion of products of combustion which may flow to the passageways 18 may be controlled by a slide 21 in the duct branch 11; and the flow of the gases through the passageways 18 and 20 and through the cylinders 14 may generally be controlled by a slide 22 in the duct 17. Slides 23—23 are also provided in the passageways 9 of the furnaces whereby one furnace may be cut off or cut in, as may be desired, and the combustion generally controlled.

The slides generally may be supported on cables 24 connected at one end to the slide, passing upwardly over pulleys 25—25 and connected to a counterpoise weight 26 as clearly shown for the slide 22, Fig. 2, but the exact construction and mode of operation of these slides forms no essential part of my invention.

From the above description, it will now be apparent that by manipulating the slides 19 and 20, the flow of the products of combustion may be admitted to or cut off from any one of the cylinders 14 or any number of them in multiple; and correspondingly, more or less of the products of combustion may be directed directly to the stack 13 by manipulation of the slide 21 and the rate of flow through the cylinders 14 may be regulated by manipulating the door 22 to control the draft therethrough; and that the draft generally may be varied by manipulating the doors 21, 22 and 23; and if desired, all of the cylinders 14 which have their passageways 16 and 18 open or partly open may be cut in or cut out by manipulation of the door 22.

Thus, for one or more than one of the cylinders 14, which it may be desired to operate at the same time, any desired amount of the products of combustion from the furnaces 1—1 may be directed therethrough for the purposes to be described.

The drying cylinders 14 may be of any suitable or well known construction such as that of one of the commercial types of drier. In the form illustrated, the cylinder 14, preferably formed from sheet metal, has annular external supporting rings 27—27 resting upon rollers or wheels 28 having flanges 29 overlapping the axial ends of the rings 27. The cylinder 14 is thus rotatably supported on the rollers 28 and fixed against axial movement.

A ring gear 30 around the outside of the cylinder 14 meshes with a power-driven pinion 31 whereby the cylinder 14 may be rotated. The cylinder 14 is disposed with its axis slightly inclined and interiorly the wall of the cylinder has secured thereto a plurality of longitudinally extending ribs or lugs 32 (see Figs. 4 and 5).

In a well known manner, material charged into the high or left-hand end (as viewed in the drawings Figs. 1 and 2) of the rotating cylinder 14 will be continually agitated and will move toward the lower end and be discharged therefrom.

As hereinbefore referred to, garbage of high percentage moisture content is fed or conducted through the plant in a manner to completely consume the same by combustion. The course of the garbage through the plant and the apparatus for handling the same will now be described.

The garbage when delivered to the plant may be stored in a pit, deposited on a floor such as the floor 34 or otherwise temporarily stored, from which storage it may be delivered upon a conveyor such as the conveyor 35 for conveying it to the combustion plant proper. Or, the garbage or like refuse delivered at the plant may be transferred directly to the conveyor.

The particular arrangement of the plant for receiving and handling the garbage which has been collected and delivered to the plant does not constitute an essential part of my invention.

In whatever manner the garbage is transferred to the supplying conveyor 35, it is delivered thereby and discharged into one or more, selectively, of a plurality of hoppers 36, one of which is associated with each of the drying cylinders 14. A part of such a conveyor for supplying these hoppers is illustrated in simplified form in Figs. 1, 2 and 3 and a fragment thereof illustrated in Figs. 6 and 7 to a larger scale.

While various forms of conveyor for this purpose may be employed, the exact details constituting no essential part of my invention, the conveyor illustrated comprises generally a channel 37 upon which, at one end thereof, the garbage may be deposited, and an endless chain 38 provided with a plurality of longitudinally spaced scraping devices or vanes 39—39, the chain and channel being relatively disposed so that the devices 39 will sweep through the channel 37 and thus convey along longitudinally of the channel, material deposited therein. The chain 38 may be mounted upon sprockets or other supporting means such as that illustrated at 41, Fig. 4, for maintaining the same in longitudinal movement; and thus when the chain moves in the direction of the arrow 40, material in the channel 37 will be moved therealong.

As indicated in Figs. 1 and 2 and as more clearly shown in Fig. 4, such a conveyor may be supported with the channel 37 extending over the row of the series of hoppers 36, and as the chain moves along in the direction of the arrow 40 of Fig. 4, means is provided to discharge material therefrom into the hoppers. To this end, at spaced intervals along the channel 37 its web is provided with discharge openings 42 (see Fig. 6) and a sliding door 43 for each opening, the door being adapted to be moved from open to closed position and vice versa by the mechanism illustrated generally at 46. The door 43 is supported on guides 47 so that it may slide back and forth in a horizontal plane and has mounted thereon a toothed rack 44 with which is meshed a pinion 45 supported on a shaft 47' mounted in bearings 48—48 on the channel 37. A wheel 49 is connected to the shaft and thus when the wheel is turned in one direction the pinion will move the rack 44 to slide the door 43 on the support 47 in a direction to open the discharge opening 42 and in the other direction to close it.

If desired, a depending chain 50 on the wheel 49 may be provided whereby it may be turned by an operator at a lower level.

The mechanism 46, shown to an enlarged scale in Figs. 6 and 7, is indicated at 46 in Fig. 4 which illustrates its disposition directly over one of the hoppers 36. Each of the hoppers 36 as in Fig. 4 may be provided with such a means and with such a discharge opening 42.

By this arrangement, a supply of garbage or the like moving along the channel 37 may be optionally discharged into any one of the hoppers 36 or into any number of them concurrently. In the latter instance, it is presupposed that the quantity conveyed in the channel 37 is more than enough to supply one hopper at a time. Where the amount of refuse flowing along the channel 37 is regulated to supply one hopper at a time, the devices 46 may be singly and selectively operated from time to time to insure a supply of garbage to each of the hoppers 36 as may be desired from time to time.

A spiral screw conveyor 52 of any known or suitable construction is disposed directly under or at the bottom of each of the hoppers 36 and may be rotatably driven by any suitable driving means such as that illustrated generally at 53, and which may comprise an electric motor 54 and transmission gearing 55 by which the rotational speed of the screw 52 may be adjusted and regulated. The conveyor 52 thus discharges material fed thereon from the sloping walls 56—56 of the hopper at a regular rate in a well known manner to a down spout 57, Figs. 2 and 4, having a forwardly inclined portion 58 projected into the upper end of the cylinder 14, so that garbage or like refuse material is fed by the conveyor 52 into the cylinder 14 at uniform rates which may be predetermined or varied as desired by regulating the speed of the screw conveyor 52.

At this point it may be assumed that combustion is going on, on the grate bars 4 and in the combustion chamber 2 (as will hereinafter be accounted for), and by a suitable setting of the slides 19, 20, 21 and 22, above described, some or all of the hot gaseous products of combustion are caused to flow downwardly through the cylinder or cylinders 14 on the way to the stack 13. The garbage or the like in the cylinder or cylinders 14 moves progressively longitudinally therethrough, being continuously churned or agitated therein and thus is brought into intimate contact with the hot gases, and moisture is evaporated therefrom.

It will be observed that the hot gases entering the upper or left end (as viewed in the drawings Figs. 1 and 2) of the cylinder or cylinders 14 come into contact with the garbage while in its wettest or most moist condition; and that as the drying operation goes on, heat is absorbed from the gases by the evaporation of moisture, the heat disappearing as the well known latent heat of evaporation, so that by the time the partly dried garbage reaches the lower end of the cylinder or cylinders 14, it is in contact with relatively cooler gases.

In this connection it may be noticed that, as is well known, garbage or like refuse may be heated without danger of driving off therefrom objectionable odors provided that the temperature is not raised to a carbonizing or scorching temperature; and that particularly there is no danger of producing odors if the heating is carried on under such conditions that the garbage is at all times immersed in water vapor or a "vapor bath". These conditions conducive to the preventing of odor are ideally present in the arrangement just described. The garbage at the upper end of the cylinder 14 has such a high moisture content that the very hot gases cannot scorch the same, and at the lower end of the cylinder where the moisture content is reduced, the temperature of the gas is also reduced; so that when the garbage is discharged from the lower end of the cylinder or cylinders 14, it is substantially without odor of the kind which, if discharged from the stack, would be objectionable.

I have found that in the practice of my invention, it is suitable to reduce the moisture content of the garbage in the cylinder or cylinders 14 to approximately 30% by weight, and that this may readily be effected in the apparatus described above by adjusting the slides to divert more or less of the hot gases through the cylinder or cylinders 14 and/or by changing the rate of supply of garbage to the cylinder or cylinders by changing the rate of speed of the corresponding conveyor or conveyors 52.

I have found that garbage having a moisture content of 30% is not liable to be burnt and give off odors by contact with the hot gaseous products of combustion which have been cooled by evaporation of moisture from the garbage to reduce its content from greater percentage proportions; and I have also found that garbage having a moisture content of substantially 30% may be completely consumed by combustion employing only the heat units therein and without supplemental fuel.

For these reasons, as stated, I reduce the moisture content to approximately 30%; and as will now be described, I convey the garbage thus partly dried to the furnace applying the drying heat and there consume it.

To this end, the garbage material in its partly dry condition discharged from the cylinder or cylinders 14, drops into a hopper 60 associated with each cylinder and the upwardly open end of which is disposed, together with the discharging end of the cylinder, in a corresponding discharge chamber 15. Each of the hoppers 60 joins a generally downwardly extending sloping spout 61 extending through an aperture in the wall of the chamber and, exteriorly thereof, discharges into a screw conveyor 62.

Preferably, a single conveyor 62 is provided extending transversely under all of the cylinders 14 and rotatably driven by an electric motor or like source of power 63. The conveyor 62 may thus be rotated at sufficient speed and be of such size as to convey away from all of the spouts 61 garbage discharged therethrough when all of the cylinders 14 are operating.

The conveyor 62 discharges the material upon an upwardly inclined conveyor shown generally at 64, Figs. 1, 3 and 5. This conveyor may suitably be constructed similarly to that indicated at 35 and hereinbefore described, particularly in connection with Figs. 6 and 7. The conveyor 64 as illustrated comprises an upwardly inclined flight 65 directly upon which the material is discharged from the conveyor 62. At the top of the flight 65, the conveyor is extended horizontally as at 66, Figs. 3 and 4 directly above a series of hoppers 67—67 disposed above the cells of the furnaces 1—1.

As above described, the furnaces each comprise two cells 3 and grate bars 4 for each cell; and I thus find it suitable to provide two hoppers 67 over each of the sets of grate bars 4 of the cells. The hoppers 67 feed downwardly into spouts 68 through a top wall or roof 69 of the furnace cell, and thus discharge directly upon the grate bars 4. As illustrated in Fig. 3, one of the devices 46, above described, may be provided in the conveyor channel 70 in portions thereof over the hoppers 67 and operated as described in connection with Figs. 6 and 7 to effect discharge of the material on the conveyor portion 66 into the hoppers selectively individually or in one or more simultaneously. Thus the garbage may be supplied to the hoppers 67 in an operative manner to maintain a supply therein at all times to feed the furnace or furnaces or a cell or cells thereof upon which it is desired that the combustion shall take place.

The chain 72 of the conveyor 64 may be supported on sprocket wheels or the like 73—73, three of which may be provided as shown in Fig. 3 whereby the chain moving through the channel 70 through the inclined and horizontal flights 65 and 66 thereof described may return in a horizontal direction upon a suitable channel or support 74 to a point substantially above the conveyor 62 and there may descend along a substantially vertical flight 75.

Each of the hopper spouts 68 supplying garbage as fuel to the furnaces may be provided with a supply-controlling slide 76, Fig. 4, and a device, such as that shown generally at 46 and hereinbefore described in connection with Fig. 6, may be provided to propel the slide 76 outwardly or inwardly to respectively permit the garbage to flow from the hopper 67 to the furnace, or to stop the flow or to determine a rate of continual flow therefor in a manner that will be understood. The slide 76 may be constructed and operated similarly to the slide 43 hereinbefore described.

The combustion which was hereinbefore assumed to be going on upon the grate bars 4 and in the combustion chamber 2 is now continuously maintained by the garbage material dropped upon the grate bars from the hoppers 67 so that the process thus is continuous.

Any suitable power source may be provided to move the conveyor chain 72 over the wheels or sprockets 73—73 such for example as the motor 77, Fig. 5, and by providing variable speed control for the motor, the rate of movement of the chain may be adjustably varied in accordance with the rate of supply of material thereto from the conveyor 62 and the rate of discharge of material therefrom to the hoppers 67.

The material discharged upon the grate bars 4 as above described from the hoppers 67 may be distributed thereover by suitable stoking tools inserted through the stoking door 5.

It is obvious that the grate bars 4 may be of the stoker type and that the material fed thereupon from the conveyor 64 or from the hoppers 67 may be continuously stoked or fed whereby manual operation will be rendered unnecessary.

If desired, the hoppers 67 may discharge upon or into stoking apparatus external of the furnace cells 3—3 and fed thereinto by stoker mechanism of well known or suitable type. Inasmuch as stoking apparatus involving, for example, a hopper into which fuel to be stoked may be placed, is well known in this art, it is not considered necessary to illustrate or describe stoker apparatus into a hopper of which material from the hoppers 67 could be discharged.

In starting up the plant above described, it may be necessary to start a fire upon the grate bars 4 with an initial charge of supplemental fuel, but as soon as some of the garbage material fed into the cylinder or cylinders 14 from the spout or spouts 58 has made the complete circuit and is ultimately discharged upon the grate bars 4, additional supplemental fuel is unnecessary.

It will be observed that my invention is not limited to any exact proportion of moisture content of the material to be consumed. As will now be apparent, my invention provides a method and apparatus whereby garbage or like refuse containing a relatively great percentage of moisture, such a great percentage as to render it impossible of combustion by incinerating plants of the usual prior art construction, may be fed into the apparatus and completely consumed by combustion of the heat units therein and without supplemental fuel. My invention is also not limited to the partial drying of the refuse down to any particular percentage of moisture in the cylinder or cylinders 14, inasmuch as any final percentage thereof may be suitably attained by adjusting the apparatus as above described; the only essential in this connection being to evaporate out moisture down to a point at which the resultant garbage material will support its combustion on the grate bars. Preferably but not necessarily, the moisture is removed down to the point at which it will not give off objectionable odors to be discharged through the stack.

Thus the method and apparatus of my invention provides for the complete destructive combustion of garbage or like refuse containing high percentages of moisture such as 75% or the like, and which may be fed into the apparatus at one point such as at the hoppers 56 and by the potential heat units therein, and without supplemental fuel, will be completely consumed and discharged out of the stack 13 or as an ash residue in the ash pit 6.

In order that combustion may be properly and continuously maintained in the furnaces 1—1, it may be desirable to regulate the rate at which combustible fuel is fed thereto. If the material is fed too slowly, the fire may become too thin, or if fed too rapidly it may choke the fire in a well known manner. To this end, the rate at which the garbage is fed into the cylinder or cylinders 14 from the hoppers 56 may be regulated as above referred to. One means of effecting this regulation is to drive the screw conveyor 52 at various speeds by means of the adjustable speed motor 54 and/or adjustable speed transmission 55.

Upon changing the speed of the conveyor 52 to regulate the rate of supplying fuel to the furnaces, the amount of heat supplied interiorly to the cylinder or cylinders 14 may be too great or too small for the purposes herein set forth and it therefore may accordingly be varied by adjusting the damper doors or slides above described.

Again, independently of the rate of supplying garbage by the conveyor 52, the quantity of heat diverted into the cylinder or cylinders 14 may be controlled and regulated in respect to the moisture content of the garbage to reduce the moisture thereof to a suitable self-consuming proportional content.

The foregoing described adjustments of the supply of heat to and the temperature in the cylinder or cylinders 14 and the rate of movement of the garbage into the cylinder or cylinders 14 and therefrom into the furnaces 1—1 may be practiced when only a single cylinder 14 is in use. At such a time, of course only one furnace 1 would be required and perhaps only one cell 3. As the supply of garbage to the plant or to the conveyor 35 increases, one after the other of the cylinders 14 may be put into action, supplying more fuel to the furnace, and ultimately the other furnace 1 may be brought into action with all of the cylinders 14.

As one after the other of the cylinders 14 are brought into action, or reversely as one after the other is put out of action, the temperature and rate of supply of fuel and garbage and the draft through the apparatus supplied by the stack 13, may be regulated as above described to effect the pre-drying of the garbage and the supply thereof to the furnaces to effect the results above set forth.

In some instances it may be desired to provide a furnace 1 of sufficient maximum capacity to consume all of the material supplied from all of the cylinders 14 and to supply sufficient heat for all of them; and the other furnace 1 may be installed, for example as illustrated, as a reserve furnace which may be put into operation when its mate is shut down for repairs or the like.

As will be clear, I provide an incinerating plant capable of completely consuming by its own inherent heat units garbage, sludge or the like of high moisture content and which, while occupying the minimum of ground area, has an enormous maximum capacity, but which is adapted to operate equally efficiently at a fraction of its maximum capacity; and that my invention contemplates not only the destructive combustion without supplemental fuel of high moisture content garbage, but contemplates also the adjustable adaptation of the apparatus to variations of moisture content and the variations of combustibility of the garbage upon the grate bars of the furnace through a wide range of rate of garbage supply to the plant.

Furthermore, as will now be clear, the primary purpose of the incinerating plant above described is to completely consume, by its own heat units alone, and without supplemental fuel, refuse having such a high content of moisture that heretofore it has been impossible of complete combustion without supplemental fuel. In the foregoing reference is made to refuse having a percentage of moisture of the order of 75% as being refuse of this character. Obviously, there is no exact point of moisture content above which supplemental fuel has heretofore been necessary. In some cases refuse may be of lower moisture content than 75%, but may be of such material that its heat value or total heat units may be relatively small, and thus for this reason require supplemental fuel in the prior practice.

While the incinerating plant above described, embodying my invention, is capable of completely consuming without supplemental fuel, refuse of the high moisture content referred to, and of moisture content so high as to be incapable of complete combustion by prior incinerating plants without supplemental fuel, it is of course conceivable that it might be desirable to destructively consume material of some nature, not refuse as ordinarily found, and containing so much moisture and so little caloriphic value that some supplemental fuel might be necessary; and it is also conceivable that it might be desired to destructively consume material of which the moisture content might be relatively low and yet having such small caloriphic value as to require some supplemental fuel. As an example of the first class, there might be mentioned some forms of industrial waste; and as an example of the second class, might be mentioned sewage sludge having a large percentage of sand and dirt.

Thus my invention is applicable to these extreme conditions of refuse, and as will now be apparent the destructive combustion of the same may be effected by the plant of my invention with the employment of less additional or supplemental fuel than has heretofore been possible.

Thus, a secondary purpose of the plant of my invention is to consume with less supplemental fuel than has heretofore been necessary, materials of extremely poor combustible nature.

My invention is not limited to the exact details of construction shown and described inasmuch as many changes and modifications other than those set forth herein may be made without departing from the spirit and scope of my invention or sacrificing its advantages.

I claim:—

1. In an apparatus for destructively burning refuse of high moisture content, a combustion furnace comprising a combustion chamber, a stack or the like, a main passageway communicating with the stack and with the chamber for conducting hot gaseous products of combustion from the furnace to the stack, a plurality of branch passageways communicating at one end with the main passageway, a connecting passageway communicating with the other ends of the branch passageways, the connecting passageway communicating with the stack, the stack thermally effecting pressure less than atmospheric in the combustion chamber, the main passageway, the branch passageways and the connecting passageway, whereby hot gaseous products of combustion may flow from the combustion chamber to the stack through the said passageways, means for continuously conveying a supply of refuse to portions of the branch passageways adjacent the main passageway, means for selectively charging the refuse into the branch passageways, means for causing the refuse to move continuously through the branch passageways in moisture extracting relation with the hot gaseous products of combustion, in the direction of movement of the products of combustion therethrough, means for continuously conducting moisture reduced refuse from the other end portions of the passageways out to atmospheric pressure and thence to the furnace, a charging orifice for the furnace and means for introducing the refuse into the furnace orifice.

2. In an apparatus for destructively burning refuse of high moisture content, a combustion furnace comprising a combustion chamber, a stack or the like, a main passageway communicating with the stack and with the chamber for conducting hot gaseous products of combustion from the furnace to the stack, a plurality of branch passageways communicating at one end with the main passageway, a connecting passageway communicating with the other ends of the branch passageways, the connecting passageway communicating with the stack, the stack thermally effecting pressure less than atmospheric in the combustion chamber, the main passageway, the branch passageways and the connecting passageway, whereby hot gaseous products of combustion may flow from the combustion chamber to the stack through the said passageways, means for continuously conveying a supply of refuse to portions of the branch passageways adjacent the main passageway, means for selectively charging the refuse into the branch passageways, means for causing the refuse to move continuously through the branch passageways in moisture extracting relation with the hot gaseous products of combustion, in the direction of movement of the products of combustion therethrough, means for continuously conducting moisture reduced refuse from the other end portions of the passageways out to atmospheric pressure and thence to the furnace, a plurality of charging orifices for the furnace and means for selectively introducing the refuse into the furnace orifices.

3. An apparatus as described in claim 1 and in which a single flow control means is provided to adjustably vary the proportion of gaseous products of combustion flowing through the branch passageways collectively.

4. An apparatus as described in claim 1 and in which a single flow control means is provided controlling flow through the connecting passageway whereby the proportion of gaseous products of combustion flowing through the branch passageways collectively may be adjustably varied.

5. An apparatus as described in claim 1 and in which flow control means is provided to selectively vary the proportion of gaseous products of combustion flowing through each branch passageway.

6. An apparatus as described in claim 1 and in which the several branch passageways open into individual chambers, each connected with the connecting passageway through a flow regulating passage, and each having individual means for conducting refuse from the branch passageways out from the chamber to atmospheric pressure.

7. An apparatus as described in claim 1 and in which the several branch passageways open into individual chambers, each communicating with the connecting passageway through a communicating passageway, and means is provided to regulate the rate of flow through the said communicating passageways individually, and each chamber has individual means for conducting refuse from the corresponding branch passageway out from the chamber to atmospheric pressure.

IRWIN S. OSBORN.